C. S. ADAMS.
SPROCKET GUARD ATTACHMENT FOR BICYCLES.
APPLICATION FILED FEB. 5, 1921.

1,400,131.

Patented Dec. 13, 1921.

INVENTOR.
Charles S. Adams
BY
ATTORNEY

UNITED STATES PATENT OFFICE.

CHARLES S. ADAMS, OF STOCKTON, CALIFORNIA, ASSIGNOR, BY DIRECT AND MESNE ASSIGNMENTS, OF FORTY-NINE ONE-HUNDREDTHS TO HOWARD A. JONES, OF STOCKTON, CALIFORNIA.

SPROCKET-GUARD ATTACHMENT FOR BICYCLES.

1,400,131.   Specification of Letters Patent.   Patented Dec. 13, 1921.

Application filed February 5, 1921. Serial No. 442,673.

*To all whom it may concern:*

Be it known that I, CHARLES S. ADAMS, a citizen of the United States, residing at Stockton, county of San Joaquin, State of California, have invented certain new and useful Improvements in Sprocket-Guard Attachments for Bicycles; and I do declare the following to be a full, clear, and exact description of the same, reference being had to the accompanying drawings, and to the characters of reference marked thereon, which form a part of this application.

This invention relates to improvements in bicycle accessories, or attachments, the principal object being to provide a main-sprocket and chain guard which may be readily attached to any ordinary bicycle frame.

The use of a chain and sprocket guard is not of itself new, as I am aware, since most bicycles for ladies are provided with such guards, which cover the entire chain, and are provided as factory equipment.

Most men's bicycles however, are not so equipped, the makers evidently feeling that there is no need for chain guards.

I have found the opposite to be true however, since with every turn of the pedals, the trouser-leg of the rider on the side adjacent the sprocket and chain is apt to brush against the same, naturally causing the garment to be smeared and soiled with the dirt and grease usually carried by the chain.

With my improved attachment however, this cause of annoyance is eliminated, and a housing or guard is provided for the chain, but only where it is really needed, so that a small, light, and consequently inexpensive device is provided, which will have a neat appearance and will not add an appreciable amount of weight to the bicycle.

Another and very important object is attained by reason of the fact that catching of the trouser's leg between the sprocket and chain is absolutely prevented, this common occurrence being the cause of a good many accidents to riders.

These objects I accomplish by means of such structure and relative arrangement of parts as will fully appear by a perusal of the following specification and claims.

In the drawings similar characters of reference indicate corresponding parts in the several views.

Figure 1:
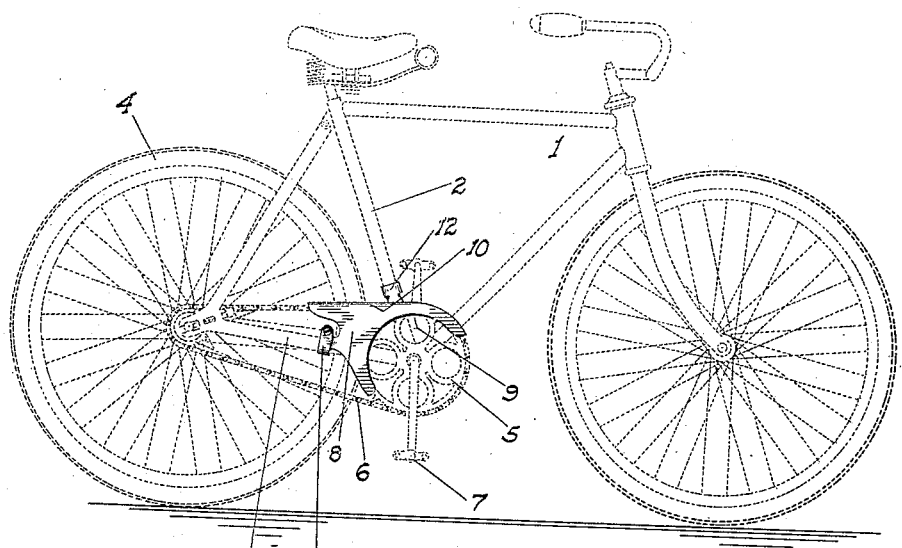
Figure 1 is an outline side elevation of a bicycle, showing my improved attachment installed thereon.
Figure 2:
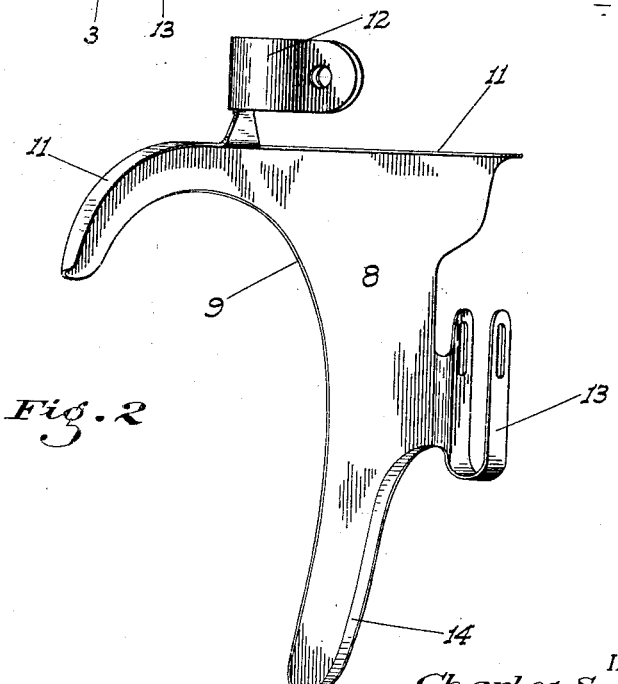
Fig. 2 is an enlarged detached perspective view of the device, looking toward the inner face of the same.

Referring now more particularly to the characters of reference on the drawings, the numeral 1 represents the bicycle in general, having as usual the central and substantially vertical and circular frame member 2 leading to the sprocket bearing or hanger, and the horizontal frame-bars 3 leading from the hanger to the axis of the rear wheel 4, the bars being usually flat ovals in cross section, vertically positioned.

The main sprocket 5 is mounted at the junction of the frame members 2 and 3, and is provided with the usual chain 6 and pedals 7.

My improved attachment consists of an outer plate 8 positioned close to and parallel to the sprocket on the outer side thereof whose inner edge is curved concentric with the sprocket as at 9, a certain distance inside the periphery of the sprocket and chain, and extending from a point about 45° ahead of the vertical center line of the sprocket to a point about 45° below the horizontal center line at the rear end of the sprocket.

The upper edge of the plate 8 extends parallel to the chain 6 and above the same as at 10, extending to the rear about half-way between the sprocket and rear wheel centers, or as may be found most desirable.

A right angled flange 11 extends the full length of this upper edge and projects inwardly over the plane of the chain.

From the flange 11 a clamp member 12 projects upwardly and inwardly, being arranged to be spread to encircle the frame-bar 2.

Another clamp member 13 is fixed to the plate 8 and is positioned to straddle the frame-bar 3, being somewhat greater in height than said bar, so that a single design of the device may be fitted to bicycles whose frame-bars 2 and 3 are positioned at varying angles relative to each other.

From the clamp 13 to the lower end of the plate 8 a flange 14 extends, formed on the plate at right angles thereto, so as to reinforce this relatively narrow portion of the plate and thus hold the same against bending while keeping down the amount of metal used and hence the weight also.

The attachment may be made large enough to accommodate the largest sprocket used, when it will also fit all smaller sizes; or a different size may be made to more accurately fit the various sized sprockets.

The attachment is preferably formed of a single piece of sheet metal, suitably bent to shape, and nickel-plated or enameled to conform to the finish of the bicycle.

From the foregoing description it will be readily seen that I have produced such a device as substantially fulfils the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention, what I claim as new and useful and desire to secure by Letters Patent is:

1. A sprocket guard for bicycles comprising a plate member adapted to partially surround the sprocket and chain adjacent thereto, and clamp members formed structurally integral with the plate, one of said clamps being adapted to embrace the vertical frame-bar of the bicycle and the other one the adjacent horizontal frame bar.

2. A sprocket guard for bicycles comprising a plate partially covering the sprocket and chain adjacent thereto, a clamp formed with the plate and adapted to encircle the vertical frame bar of the bicycle, and a U-shaped clamp formed with the plate adjacent the rear end thereof and adapted to slip vertically downward over the adjacent horizontal frame bar of the bicycle, the depth of said U-shaped clamp being greater than that of the said horizontal bar whereby the guard may fit bicycles whose horizontal and vertical frame bars are set at different angles from each other.

In testimony whereof I affix my signature.

CHARLES S. ADAMS.